United States Patent
Krone et al.

(10) Patent No.: US 6,638,159 B2
(45) Date of Patent: Oct. 28, 2003

(54) HARVESTING MACHINE HAVING A ROTATABLE EJECTION ELBOW

(75) Inventors: Bernard Krone, Spelle (DE); Josef Horstmann, Ibbenbueren (DE); Bernhard Schniederbruns, Wietmarschen (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 0 days.

(21) Appl. No.: 09/847,541

(22) Filed: May 2, 2001

(65) Prior Publication Data

US 2002/0095923 A1 Jul. 25, 2002

(30) Foreign Application Priority Data

May 4, 2000 (DE) .......................... 100 21 664

(51) Int. Cl.$^7$ .......................... A01D 17/02; A01F 12/46
(52) U.S. Cl. .......................... 460/114; 460/115; 460/119
(58) Field of Search ................... 414/340, 345, 414/389, 398, 502, 505; 56/16.6, 10.1; 460/114, 119, 115

(56) References Cited

U.S. PATENT DOCUMENTS

| | | | | |
|---|---|---|---|---|
| 3,786,945 A | * | 1/1974 | Symonds | 414/335 |
| 4,042,132 A | * | 8/1977 | Bohman et al. | 414/335 |
| 4,376,609 A | * | 3/1983 | Bohman et al. | 414/335 |
| 4,528,471 A | * | 7/1985 | Baumann | 310/111 |
| 4,529,348 A | * | 7/1985 | Johnson et al. | 414/335 |
| 5,359,838 A | * | 11/1994 | Madsen | 56/16.6 |
| 5,558,282 A | * | 9/1996 | Ameye et al. | 241/60 |
| 5,575,316 A | * | 11/1996 | Pollklas | 141/198 |
| 5,749,783 A | * | 5/1998 | Pollklas | 460/119 |
| 6,097,425 A | * | 8/2000 | Behnke et al. | 348/89 |
| 6,247,510 B1 | * | 6/2001 | Diekhans et al. | 141/231 |

FOREIGN PATENT DOCUMENTS

| | | |
|---|---|---|
| DE | 4403893 | 8/1995 |
| DE | 4427220 | 2/1996 |
| EP | 0672339 | 9/1995 |
| JP | 10000015 | 6/1998 |

\* cited by examiner

Primary Examiner—Thomas B. Will
Assistant Examiner—Arpád Fáb Kovács
(74) Attorney, Agent, or Firm—Jordan and Hamburg LLP

(57) ABSTRACT

A harvesting machine, especially a self-propelled pick-up chopper for picking up and chopping corn, wilted grass, green feed and similar harvested produce, including an ejection elbow arranged after pulling in and chopping devices for transferring harvested produce to a loading space of an accompanying vehicle. In order to free the operator of the harvesting machine from the burden of the cumbersome positioning work after each change in the direction of travel, the ejection elbow can be swiveled by a motor controlled by a control device from a first operating position into a second operating position which corresponds to the first operating position of the ejection elbow mirrored in the vertical median plane.

28 Claims, 6 Drawing Sheets

HARVESTING MACHINE HAVING A ROTATABLE EJECTION ELBOW

BACKGROUND OF THE INVENTION

The invention relates to a harvesting machine, particularly to a self-propelled pick-up chopper for picking up and chopping corn, wilted grass, green feed and similar harvested produce, with an ejection elbow, which is arranged downstream from pulling-in and chopping devices, and can be swiveled by a motor and is intended to transfer the harvested produce to a loading space of an accompanying vehicle.

Harvesting machines of the aforementioned type are known. If they are constructed as pick-up choppers, they transfer the harvested material while harvesting over the ejection elbow into the loading space of an accompanying vehicle which is traveling next to the pick-up chopper and must assume a distance and a position relative to the pick-up chopper so that when the ejection elbow is positioned, harvested material can be transferred reliably to the loading space as far as possible without loss. However, when the direction of travel of the pick-up chopper is changed on a portion of a field, time-consuming new positioning work arises for adjusting the ejection elbow accurately, because, when the pick-up chopper is traveling in the opposite direction, the accompanying vehicle must travel on the already harvested region of the field and therefore the ejection elbow must be transferred into the operating position facing this harvested region of the field.

SUMMARY OF THE INVENTION

It is an object of the present invention to simplify the time-consuming positioning work.

A harvesting machine in accordance with the invention is designed so that, when changing its direction of travel, it is possible to transfer the ejection elbow automatically into a pre-programmable position, especially into the mirror image position, through the use of the control device, so that in the case of the agreed upon positioning of the accompanying vehicle and the pick-up chopper after a change in the direction of travel, the ejection elbow assumes, for example, precisely the positioning which had existed before the change in the direction of travel. For this purpose, a time-consuming re-positioning of the ejection elbow by the operator of the pick-up chopper is not required. The time advantage while harvesting a field, associated therewith, is appreciable. Moreover, positioning mistakes are effectively decreased so that the operator, after turning the harvesting machine, can resume his harvesting travel very quickly. The motor-driven swiveling can be accomplished by known driving mechanisms, such as servomotors, hydraulic units, ratchet mechanisms and similar mechanical driving mechanisms.

The parts of the control device necessary for the control are constructed relatively simply. For example, a marking for a zero point position which can be recognized by an optical sensor which sends a signal to the control device may be provided on a turntable of the ejection elbow. By means of a proximity switch, but also, for example, by means of a gear wheel, meshing with the turntable of the ejection elbow, the angle between the first operating position and the zero point position can be determined with simple structural parts, so that, for assuming the mirror image position of the first operating position (second operating position) only the angle which may be traversed in order to reach the zero point position has to be added by the control unit in order to position the ejection elbow in the second operating position. However, the angle need not necessarily be measured digitally. Moreover, analog sensors may also be used. The angle can also be measured incrementally. Further automatic functions can be realized by means of parts for measuring angles.

Further details and advantages of the invention arise from further dependent claims, the following description and the drawings.

DESCRIPTION OF THE PREFERRED EMBODIMENTS

Figure 1:
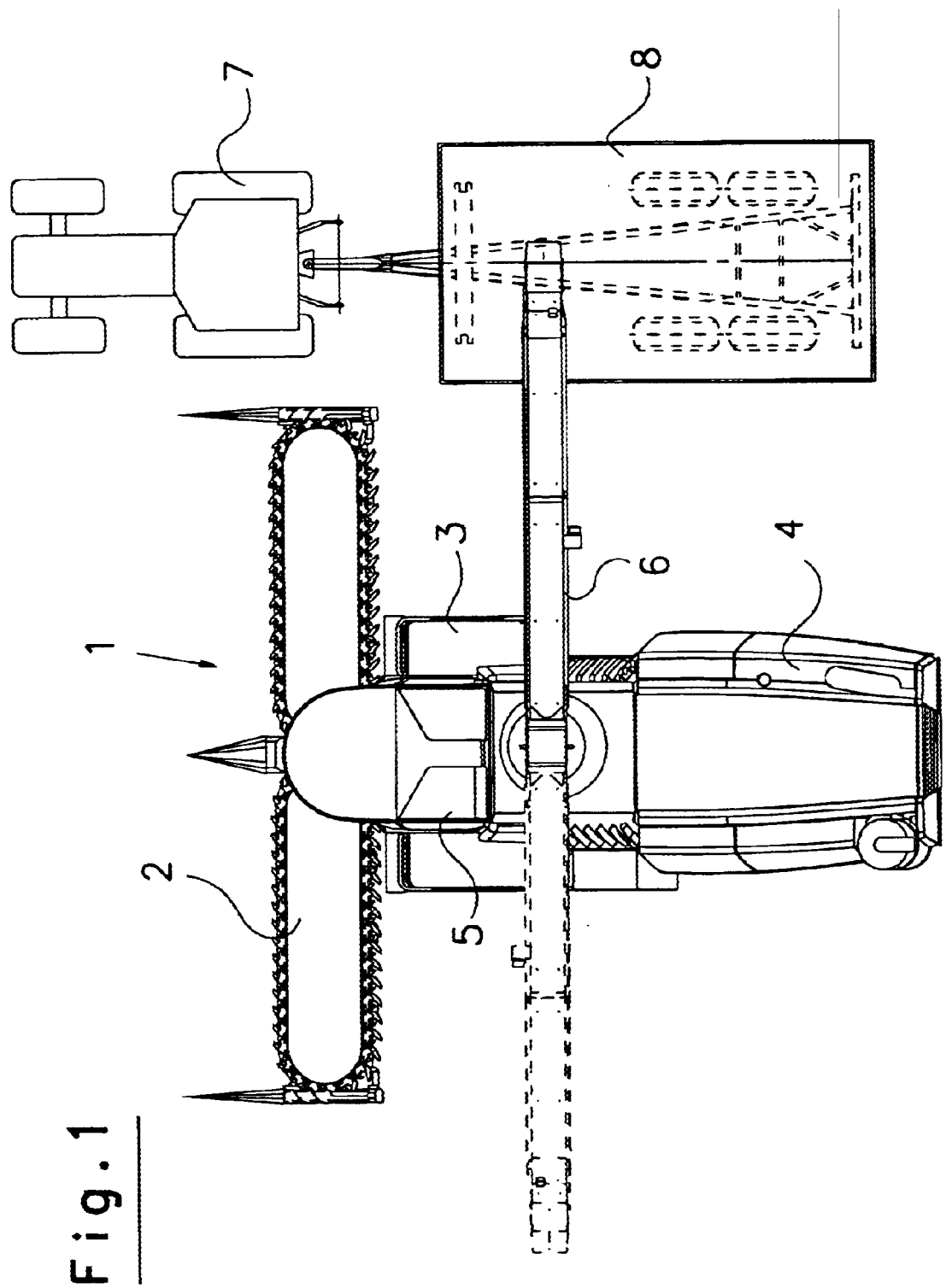
FIG. 1 shows a diagrammatic plan view of a pick-up chopper with an accompanying vehicle during the harvesting work.

The harvesting machine, labeled 1 in FIG. 1, is constructed as a self-propelled pick-up chopper and, as attachment, has a corn harvester or chopper teeth 2, a chassis 3, units typical of a pick-up chopper and covered by a housing 4, such as motor and transmission units, drawing-in organs and chopping devices, a driver cabin 5, as well as an ejection elbow 6 which can be swiveled by a motor. An agricultural tractor 7 which pulls a trailer 8 into the loading space 9 of which the ejection elbow 6 has to transfer the harvested produce is shown in FIG. 1. In order to be able to position the ejection elbow 6 precisely once again also when the direction of travel of the pickup-up chopper 1 and the combination of agricultural tractor 7 and trailer 8 is changed, the motor-driven swiveling driving-mechanism of the ejection elbow 6 is connected with a control unit 17, which transfers the ejection elbow 6 from the first operating position, marked with solid lines in FIG. 1, into the second operating position in the vertical median plane of the pick-up chopper 1.

In this manner, the positioning work after a change in the direction of travel of the pickup-up chopper 1 as well as of the agricultural tractor can be simplified greatly, in that the tractor driver need only assume the agreed upon position with respect to the pick-up chopper, while the ejection elbow 6, automatically in view of the motor-driven driving mechanism and the control device coupled to the motor-driven driving mechanism, assumes the angular ejection position provided for the previous harvesting travel.

Figure 2:
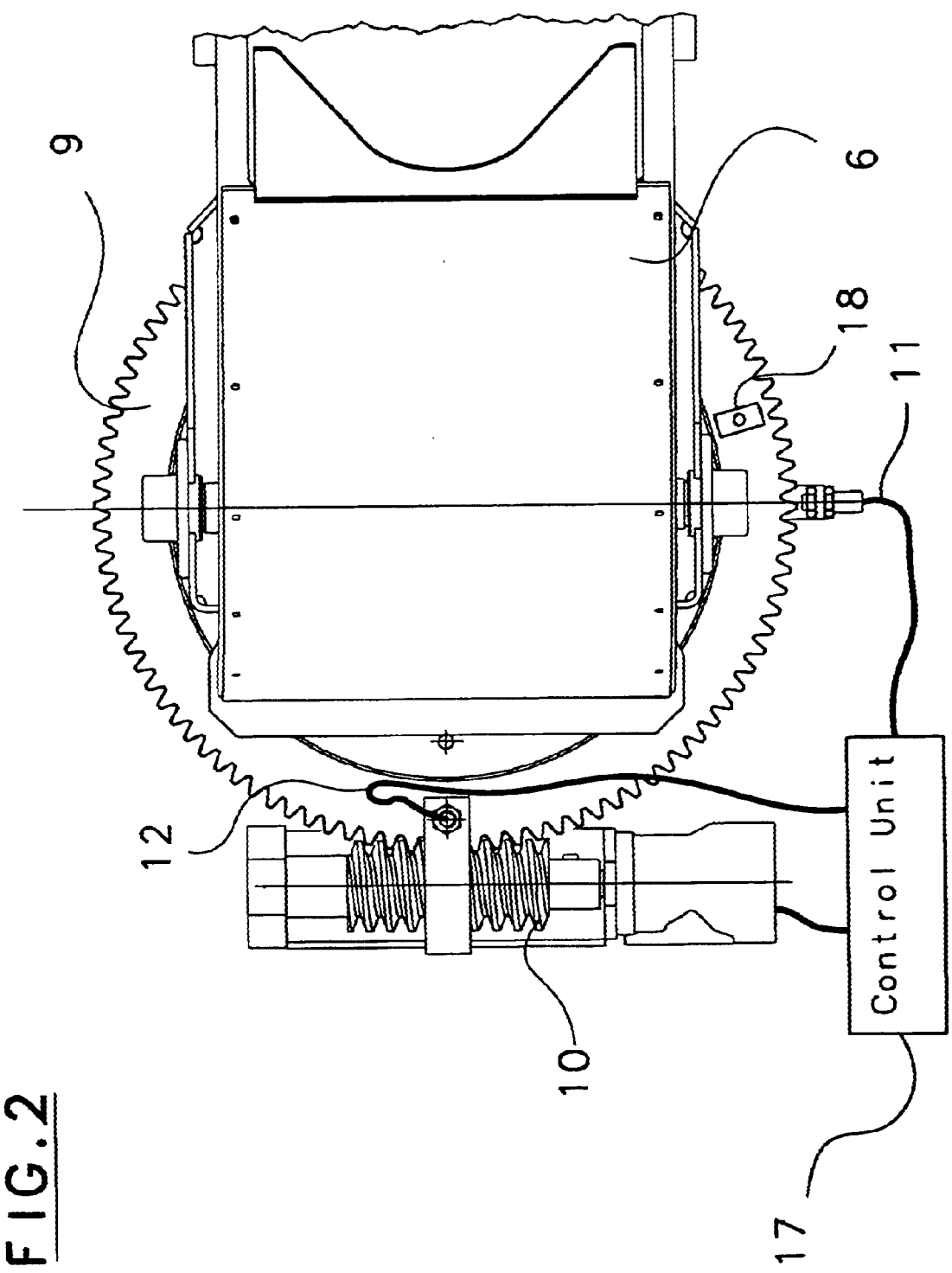
FIG. 2 shows a cutaway, in a diagrammatic plan view of the region of an ejection elbow adjoining the turntable driving mechanism.

In addition, the embodiment shown in FIG. 2, in which the ejection elbow 6 is driven over a turntable 9 and a spindle driving mechanism 10, has a proximity switch 11 as well as an optical sensor 12. The proximity switch 11 determines the teeth of the turntable 9 moving past it in the course of a swiveling motion. The sensor 12 checks the turntable 9 for the zero marking 18, provided on the turntable 9, so that the control unit 17 receives a control signal, as soon as the zero position is reached in the course of a swiveling motion. After that, the distance covered until the zero position signal is received is determined on the basis of the number of teeth detected and added by the control unit 17 for the swiveling angle, which must still be traversed after the zero position. When this adjustment angle, which must be added, is reached, the motor-driven driving mechanism 10 is stopped. The ejection elbow 6 has reached the second operating position which corresponds to the first operating position reflected at the vertical longitudinal median plane of the harvesting machine 1.

Figure 3:
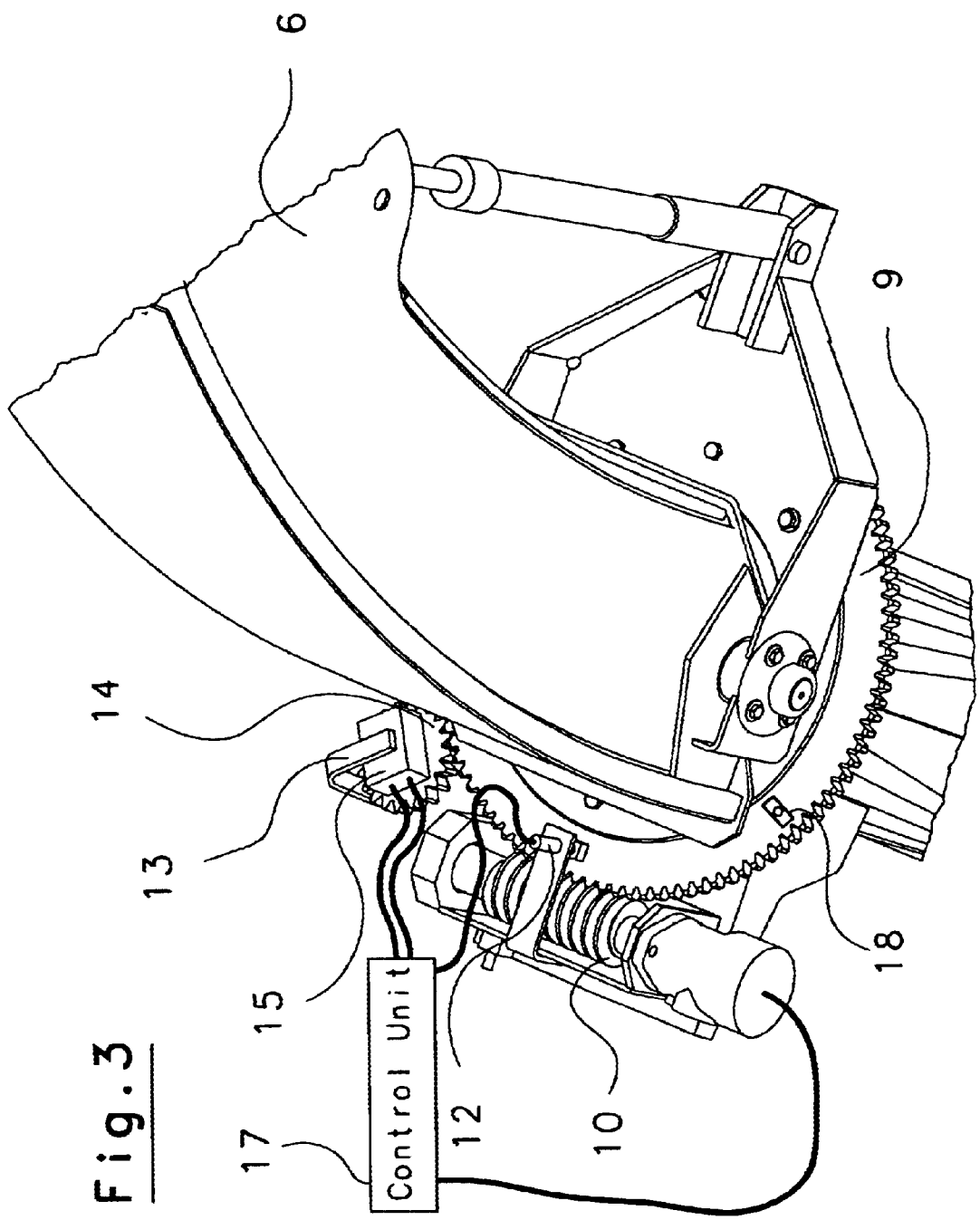
FIG. 3 shows a cutaway of an alternative example to the example of FIG. 2 in a diagrammatic, perspective representation obliquely from above of the driving mechanism region of the ejection elbow.

In the embodiment shown in FIG. 3, instead of a proximity switch 11, a counter unit 13 is provided which comprises a gear wheel 14 which meshes with the turntable 9 and a counter 15. The number of revolutions or of the partial revolution of the gear wheel 14 is determined by the counter 15 and passed on to the control unit 17 connected thereto. The revolution or the partial revolution of the gear wheel 14 until the zero point position 18, determined by the sensor 12, is reached, otherwise corresponds to the procedure, which was explained for the embodiment shown in FIG. 2.

Figure 4:
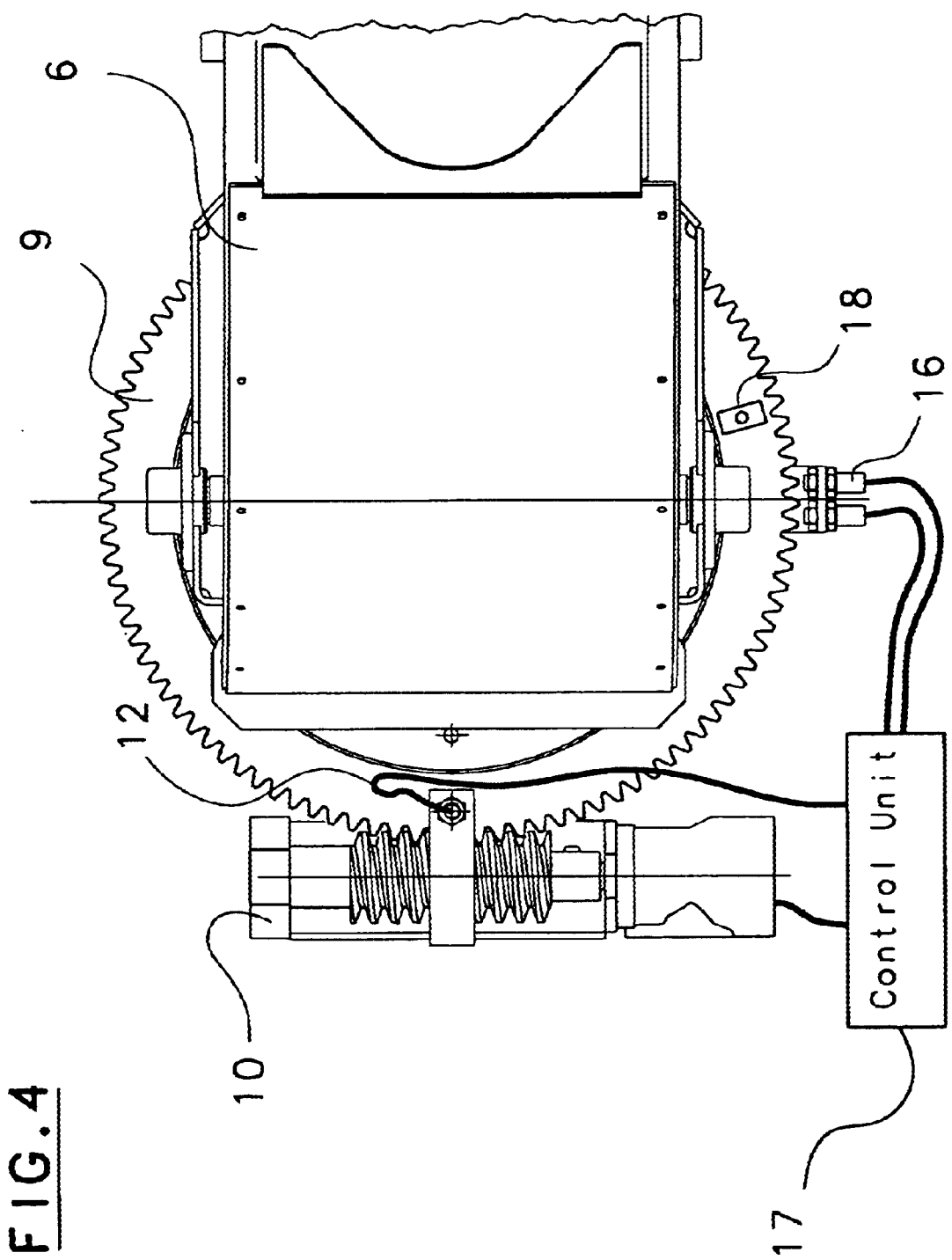
FIG. 4 shows a representation, similar to that of FIG. 3, of an alternative example.

In FIG. 4, with an otherwise essentially identical configuration, the proximity switch 11 is replaced by a double proximity switch 16, with which the direction of rotation can be determined in addition.

Figure 5:
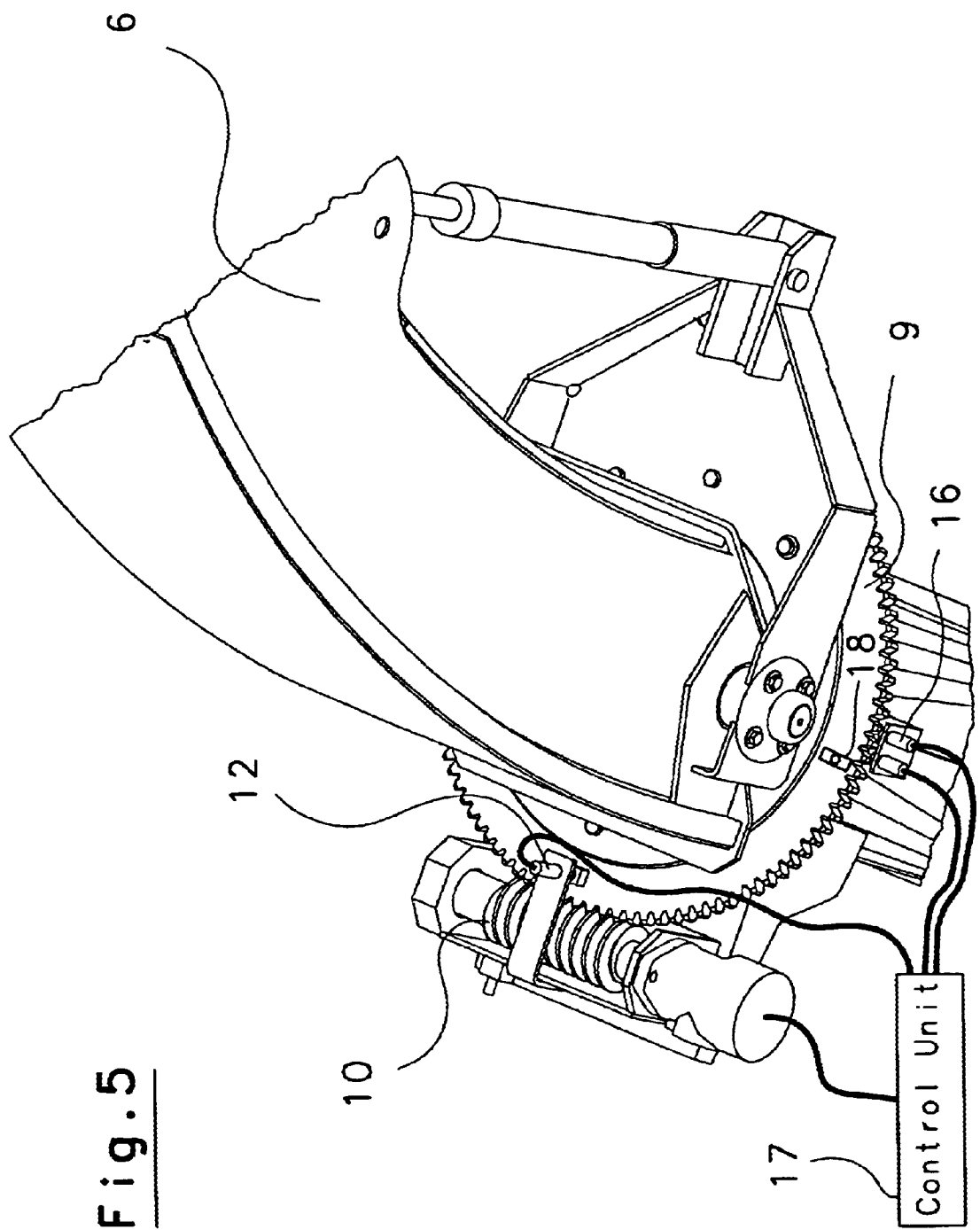
FIG. 5 shows a representation, similar to that of FIG. 2, of an alternative example.

FIG. 5 illustrates once again, in a perspective view, the embodiment shown in FIG. 4.

Figure 6:
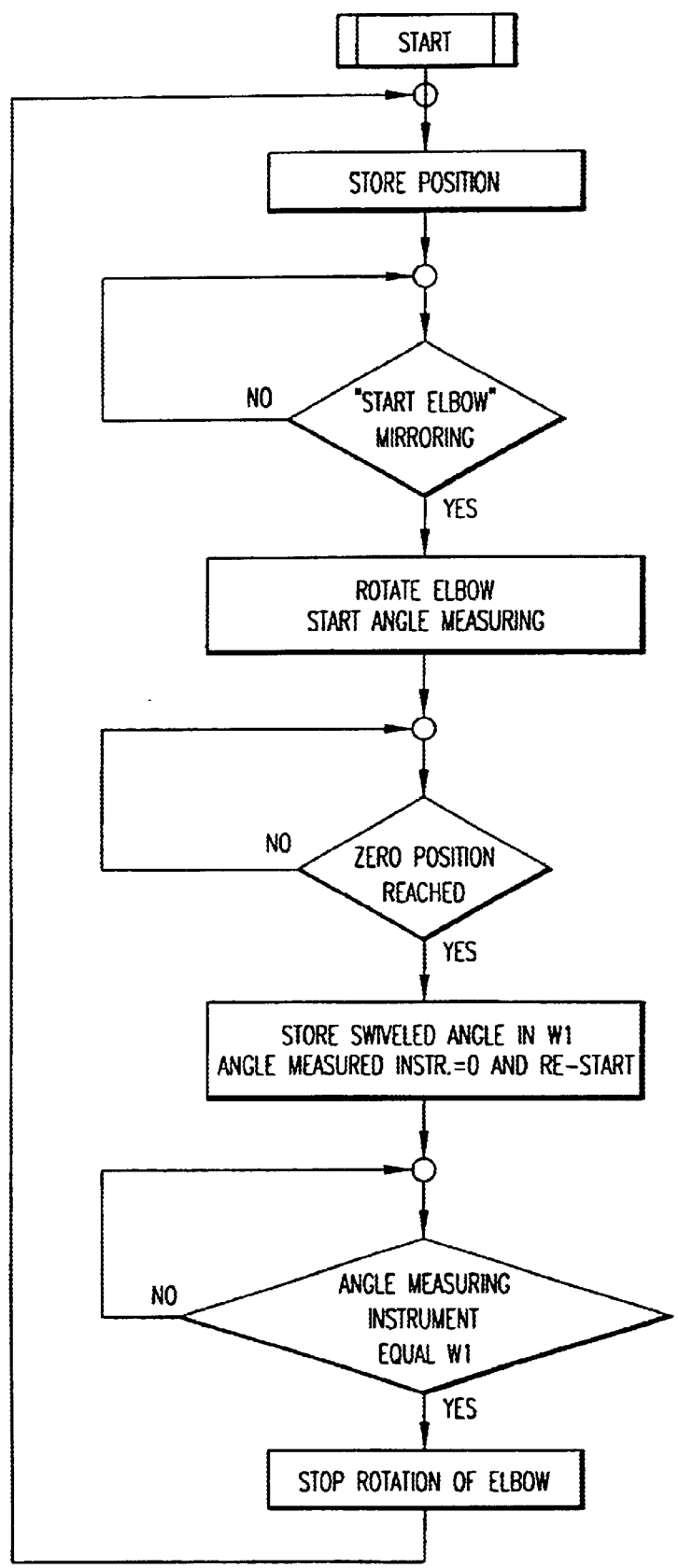
FIG. 6 shows a labeled block circuit diagram for controlling an example of a control unit for an inventive harvesting machine.

In FIG. 6, the mode of action of an example of a control unit 17 for the harvesting machine in accordance with the invention is illustrated by means of a block circuit diagram, which describes the individual functions.

What is claimed is:

1. A harvesting machine, comprising:
   an ejection elbow arranged downstream from pulling in and chopping devices and to transfer the harvested material to a loading space of an accompanying vehicle;
   a motor for swiveling the ejection elbow; and
   a control device arranged to automatically control the motor to swivel the ejection elbow from a first operating position in to a second pre-programmable operating position, the second operating position corresponding to the first operating position of the ejection elbow mirrored at the vertical, longitudinal, median plane of the harvesting machine,
   the control device comprising a zero position sensor, an angle measuring counter and a control unit.

2. The harvesting machine of claim 1, wherein the ejection elbow can be swivelled over a turntable having teeth and the angle measuring counter is constructed as a proximity switch counting the teeth of the turntable.

3. The harvesting machine of claim 2, wherein a zero position, which is read by a proximity sensor, is marked on the turntable of the ejection elbow.

4. The harvesting machine of claim 1, wherein the ejection elbow is swivelled over a turntable having teeth and the angle measuring counter is constructed as a counter for counting the teeth of the turntable.

5. The harvesting machine of claim 4, wherein the counter has a gear wheel meshing with the turntable of the ejection elbow.

6. In a harvesting machine including a material working device for processing agricultural material, an ejection elbow through which the processed material is adapted to pass and a motor for rotating said ejection elbow, the improvement comprising
   a control unit coupled to said ejection elbow and said motor and arranged to automatically control rotation of said ejection elbow via said motor such that said ejection elbow is rotatable between a first operating position and a second pre-determined operating position,
   said first and second operating positions being opposite positions relative to a vertical, longitudinal median plane of the harvesting machine,
   said control unit comprising a zero position sensor for determining a zero position of said ejection elbow and an angle measuring counter for measuring rotation of said ejection elbow.

7. The harvesting machine of claim 6, further comprising a chassis, said ejection elbow being arranged downstream from said material working device on said chassis.

8. The harvesting machine of claim 6, wherein said control unit is arranged to determine a first angle of rotation of said ejection elbow from the first operating position to a position at which said zero position sensor determines the zero position of said ejection elbow, to determine a second angle of rotation of said ejection elbow from the position at which said zero position sensor determines the zero position of said ejection elbow to the second operating position based on the first angle of rotation and control said motor to rotate said ejection elbow over the second angle of rotation to the second operating position.

9. The harvesting machine of claim 6, further comprising a turntable having teeth and being coupled to said ejection elbow, said angle measuring counter being arranged to count said teeth of said turntable during rotation of said turntable.

10. The harvesting machine of claim 9, wherein said turntable includes a marked zero position, said zero position sensor being an optical sensor arranged to recognize said marked zero position.

11. The harvesting machine of claim 6, further comprising a turntable having teeth and being coupled to said ejection elbow, said angle measuring counter meshing with said teeth of said turntable.

12. The harvesting machine of claim 11, wherein said angle measuring counter comprises a gear wheel meshing with said turntable whereby the rotation of said ejection elbow is determined based on the number of revolutions of said gear wheel.

13. The harvesting machine of claim 6, wherein said angle measuring counter comprises a single proximity switch.

14. The harvesting machine of claim 6, wherein said angle measuring counter comprises a double proximity switch.

15. The harvesting machine of claim 6, further comprising a turntable having teeth and being coupled to said ejection elbow, said motor comprises a spindle driving mechanism engaging with said teeth of said turntable.

16. A harvesting machine comprising:
   a material working device for processing agricultural material;
   an ejection elbow through which processed material from said material working device is adapted to pass;
   rotation means for rotating said ejection elbow; and
   control means for automatically controlling rotation of said ejection elbow via said rotation means such that said ejection elbow is rotatable between a first operating position and a second predetermined operating position,
   said control means comprising position determining means for determining a zero position of said ejection elbow and angle measuring means for measuring angular rotation of said ejection elbow.

17. The harvesting machine of claim 16, wherein said control means comprise position determining means for determining a zero position of said ejection elbow and angle measuring means for measuring angular rotation of said ejection elbow.

18. The harvesting machine of claim 16, further comprising a turntable having teeth and being coupled to said ejection elbow, said angle measuring means being arranged to count said teeth of said turntable during rotation of sad turntable.

19. The harvesting machine of claim 18, wherein said turntable includes a marked zero position, said position determining means being an optical sensor arranged to recognize said marked zero position.

20. The harvesting machine of claim 16, further comprising a turntable having teeth and being coupled to said ejection elbow, said angle measuring means meshing with said teeth of said turntable.

21. The harvesting machine of claim 20, wherein said angle measuring means comprise a gear wheel meshing with said turntable whereby the rotation of said ejection elbow is determined based on the number of revolutions of said gear wheel.

22. The harvesting machine of claim 16, further comprising a turntable having teeth and being coupled to said ejection elbow, said rotation means comprising a spindle driving mechanism engaging with said teeth of said turntable.

23. The harvesting machine of claim 16, wherein said first and second operating positions are opposite positions relative to a vertical, longitudinal median plane of the harvesting machine.

24. A method for controlling rotation of an ejection elbow of a harvesting machine through which agricultural material passes from a first operating position to a second predetermined operating position; comprising the steps of:

mounting the ejection elbow on a rotatable turntable;

marking the turntable with a zero position mark;

starting rotation of the turntable;

determining when the zero position mark passes a fixed location;

determining a first angle of rotation of the turntable from the first operating position to the position at which the zero position mark passes the fixed location;

calculating a second angle of rotation of the turntable from the position at which the zero position marks passes the fixed location to the second operating position based on the first angle of rotation; and stopping rotation of the turntable after the turntable has been rotated over the second angle of rotation such that the turntable is positioned in the second operating position when rotation of the turntable stops.

25. The method of claim 24, wherein the step of determining when the zero position mark passes the fixed location comprises the step of mounting an optical sensor in a fixed position on a chassis to which the turntable is mounted.

26. The method of claim 24, wherein the steps of starting rotation of the turntable and continuing rotation of the turntable comprise the step of controlling rotation of a spindle driving mechanism engaging with the turntable.

27. The method of claim 24, wherein the step of determining the first angle of rotation of the turntable comprises the step of counting teeth of the turntable passing a fixed location during the rotation of the turntable.

28. The method of claim 24, wherein the step of determining the first angle of rotation of the turntable comprises the steps of arranging a gear wheel in meshing engagement with the turntable and determining the number of revolutions of the gear wheel during the rotation of the turntable.

* * * * *